US009209555B2

(12) United States Patent
Tsujii et al.

(10) Patent No.: US 9,209,555 B2
(45) Date of Patent: Dec. 8, 2015

(54) CONNECTOR AND METHOD FOR MANUFACTURING SAME

(75) Inventors: Yoshitomo Tsujii, Yokkaichi (JP); Hiroki Hirai, Yokkaichi (JP); Tomoyuki Sakata, Yokkaichi (JP); Hisashi Sawada, Yokkaichi (JP)

(73) Assignees: AUTONETWORKS TECHNOLOGIES, LTD. (JP); SUMITOMO WIRING SYSTEMS, LTD. (JP); SUMITOMO ELECTRIC INDUSTRIES, LTD. (JP)

( * ) Notice: Subject to any disclaimer, the term of this patent is extended or adjusted under 35 U.S.C. 154(b) by 94 days.

(21) Appl. No.: 14/123,334

(22) PCT Filed: Apr. 13, 2012

(86) PCT No.: PCT/JP2012/060122
§ 371 (c)(1),
(2), (4) Date: Jan. 31, 2014

(87) PCT Pub. No.: WO2012/165063
PCT Pub. Date: Dec. 6, 2012

(65) Prior Publication Data
US 2014/0140763 A1    May 22, 2014

(30) Foreign Application Priority Data

Jun. 2, 2011   (JP) .................................. 2011-124091

(51) Int. Cl.
*H01R 13/533*   (2006.01)
*H01R 13/504*   (2006.01)
(Continued)

(52) U.S. Cl.
CPC .......... *H01R 13/533* (2013.01); *B29C 45/1676* (2013.01); *H01R 13/504* (2013.01); *H01R 43/18* (2013.01); *B29C 45/14467* (2013.01); *B29C45/1671* (2013.01); *B29L 2031/36* (2013.01); *H01R 43/24* (2013.01); *Y10T 403/74* (2015.01)

(58) Field of Classification Search
CPC ............. H01R 13/5205; H01R 13/521; H01R 2201/26; H01R 13/5219; H01R 13/5202
See application file for complete search history.

(56) References Cited

U.S. PATENT DOCUMENTS

| 7,104,840 B2 * | 9/2006 | Murakami .................... 439/587 |
| 2004/0124332 A1 | 7/2004 | Takenaka et al. |

(Continued)

FOREIGN PATENT DOCUMENTS

| JP | 2004-215355 | 7/2004 |
| JP | 2008-146988 | 6/2008 |

(Continued)

OTHER PUBLICATIONS

International Search Report of Jul. 17, 2012.

*Primary Examiner* — Truc Nguyen
(74) *Attorney, Agent, or Firm* — Gerald E. Hespos; Michael J. Porco; Matthew T. Hespos

(57) ABSTRACT

In a connector (10) with a first housing (11) made of resin and including a first terminal portion (42A) connected to a first device and a second housing (25) made of resin and including a second terminal portion (42B) connected to a second device, the first and second housings (11, 25) are coupled and united by a coupling portion (30) made of rubber and formed by insert molding or two-color molding. A method for manufacturing the connector (10) of the present invention includes a uniting step of coupling and uniting the first and second housings (11, 25) by the coupling portion (30) made of rubber by insert molding or two-color molding.

5 Claims, 10 Drawing Sheets

(51) Int. Cl.
 *H01R 43/18* (2006.01)
 *H01R 43/24* (2006.01)
 *B29L 31/36* (2006.01)
 *B29C 45/14* (2006.01)
 *B29C 45/16* (2006.01)

(56) References Cited

U.S. PATENT DOCUMENTS

| 2007/0197069 A1* | 8/2007 | Iwahori et al. | 439/157 |
| 2008/0009171 A1* | 1/2008 | Tsuji | 439/352 |
| 2008/0105476 A1* | 5/2008 | Korich et al. | 180/65.2 |
| 2009/0023305 A1* | 1/2009 | Korich et al. | 439/34 |
| 2009/0023342 A1* | 1/2009 | Korich et al. | 439/620.21 |
| 2011/0065298 A1* | 3/2011 | Tanae et al. | 439/189 |
| 2012/0040553 A1* | 2/2012 | Tashiro | 439/359 |
| 2012/0238147 A1* | 9/2012 | Matsumoto et al. | 439/660 |
| 2012/0238150 A1* | 9/2012 | Sakamoto et al. | 439/660 |
| 2014/0011401 A1* | 1/2014 | Endo et al. | 439/588 |

FOREIGN PATENT DOCUMENTS

| JP | 2010-80106 | 4/2010 |
| WO | 2011/016272 | 2/2011 |

* cited by examiner

CONNECTOR AND METHOD FOR MANUFACTURING SAME

BACKGROUND

1. Field of the Invention

This invention relates to a connector and a method for manufacturing the same.

2. Description of the Related Art

Various devices such as a motor and an inverter are mounted in electric vehicles and hybrid vehicles. These devices are generally connected by a harness. If two devices to be connected are mounted at proximate positions, a large space for fastening the respective devices is necessary.

Accordingly, a configuration for uniting a motor and an inverter is proposed in Japanese Unexamined Patent Publication No. 2004-215355.

However, in the configuration proposed in Japanese Unexamined Patent Publication No. 2004-215355, the motor and the inverter are connected by a coupling member (alternating current terminal) and the coupling member is immovably fixed to the respective devices. Thus, in the configuration as described above, it is difficult to absorb manufacturing tolerances and mounting tolerances of the devices and the coupling member and the devices may be destroyed due to relative vibration of two devices or the like.

SUMMARY OF THE INVENTION

The present invention was developed in view of the above situation and aims to provide a connector capable of absorbing tolerances and vibration of devices.

To solve the above problem, the present invention is directed to a connector, comprising a first housing made of resin and including a first terminal portion connected to a first device and a second housing made of resin and including a second terminal portion connected to a second device, wherein the first and second housings are coupled and united by a coupling portion made of rubber and formed by insert molding or two-color molding.

The present invention is also directed to a method for manufacturing a connector with a first housing made of resin and including a first terminal portion connected to a first device and a second housing made of resin and including a second terminal portion connected to a second device, comprising a uniting step of coupling and uniting the first and second housings by a coupling portion made of rubber by insert molding or two-color molding.

Since the coupling portion for coupling the first and second housings is made of rubber in the present invention, it absorbs manufacturing tolerances and mounting tolerances of the first device connected to the first terminal portion and the second device connected to the second terminal portion and vibration of the devices. As a result, according to the present invention, it is possible to provide a connector capable of absorbing tolerances and vibration of devices.

Further, since the coupling portion is united with the respective housings by two-color molding or insert molding in the present invention, the coupling portion and the housings are firmly joined and joint portions have excellent strength and waterproof sealability as compared with the case where the coupling portion and the respective housings are joined by an adhesive.

The present invention may be configured as follows.

A connecting member may be provided which includes the first terminal portion on one end part and the second terminal portion on another end part. If such a configuration is adopted, the two devices can be connected by one connecting member, wherefore a simple configuration can be adopted and manufacturing cost can be reduced.

A resiliently deformable bent portion may be provided between the one and other end parts of the connecting member. If such a configuration is adopted, tolerances of the devices can be absorbed by resilient deformation of the bent portion of the connecting member between the two housings.

According to the present invention, it is possible to provide a connector capable of absorbing tolerances and vibration of devices.

DETAILED DESCRIPTION OF THE PREFERRED EMBODIMENTS

A connector 10 of one embodiment of the present invention is described with reference to FIGS. 1 to 11. In the following description, an upper side of FIG. 2 is an upper side and a lower side thereof is a lower side.

The connector 10 of this embodiment is arranged in a vehicle body (not shown) of an electric vehicle or a hybrid vehicle and electrically connects an inverter (an example of a first device) and a motor (an example of a second device) arranged in this vehicle body.

Figure 1:
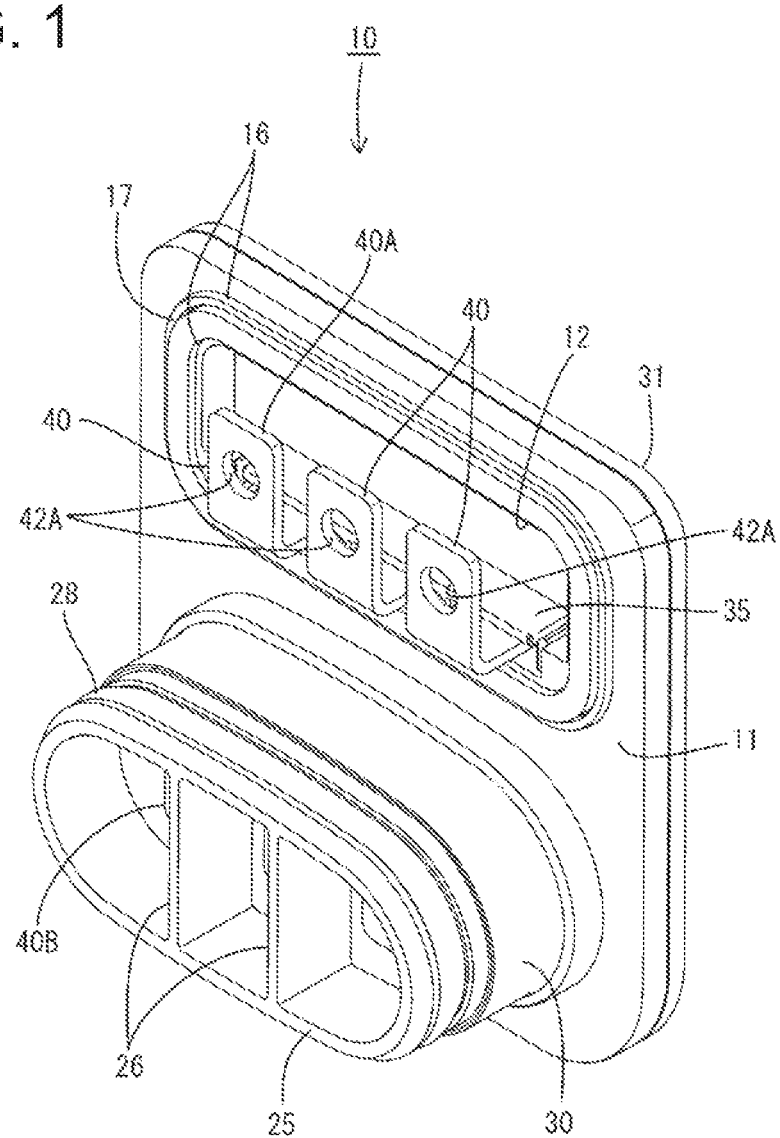
FIG. 1 is a perspective view of a connector of one embodiment.
Figure 2:
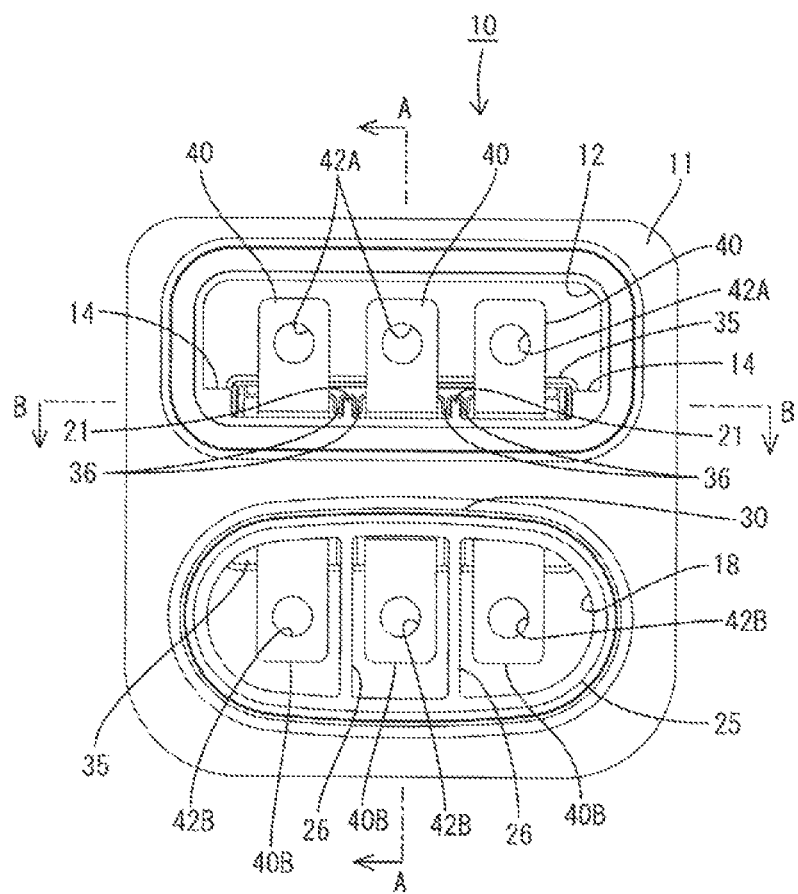
FIG. 2 is a front view of the connector.

As shown in FIGS. 1 and 2, the connector 10 is provided with a first housing 11 made of synthetic resin and including first terminal portions to be connected to (terminals of) the inverter and a second housing 25 made of synthetic resin and including second terminal portions to be connected to (terminals of) the motor, the first and second housings 11, 25 being vertically arranged.

Figure 5:
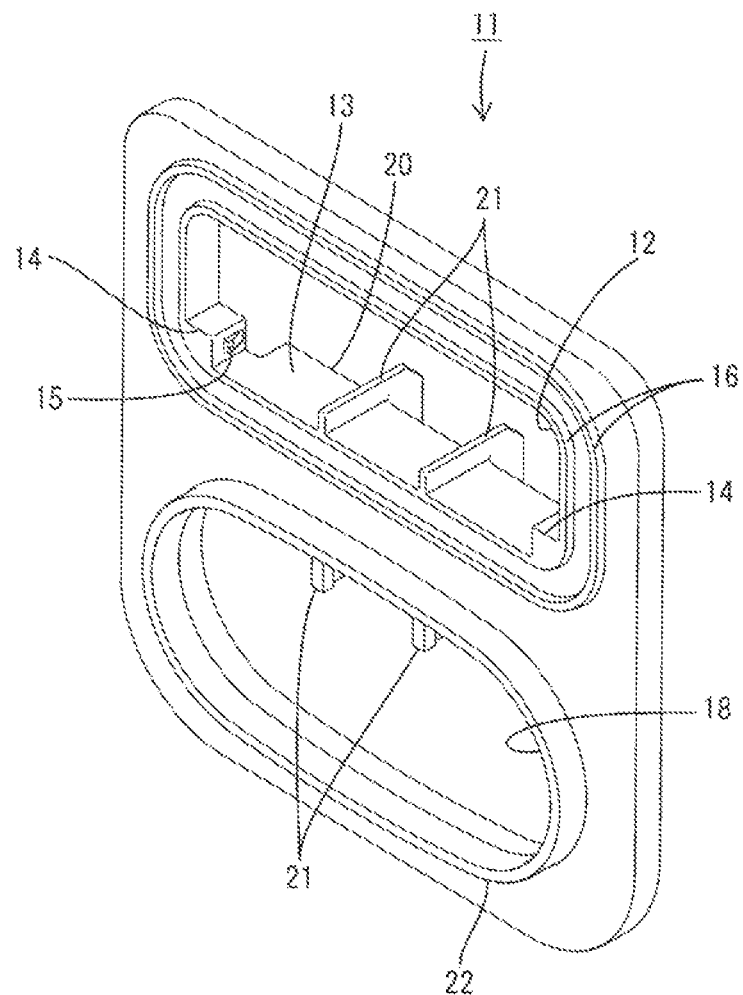
FIG. 5 is a perspective view showing a first housing before a second housing is coupled.

As shown in FIGS. 1 and 5, the first housing 11 includes a substantially rectangular first opening 12 and an elliptical second opening 18. An inverter-side connector is mounted into the first opening 12. The second housing 25 is provided in the second opening 18 via a coupling portion 30.

Figure 3:
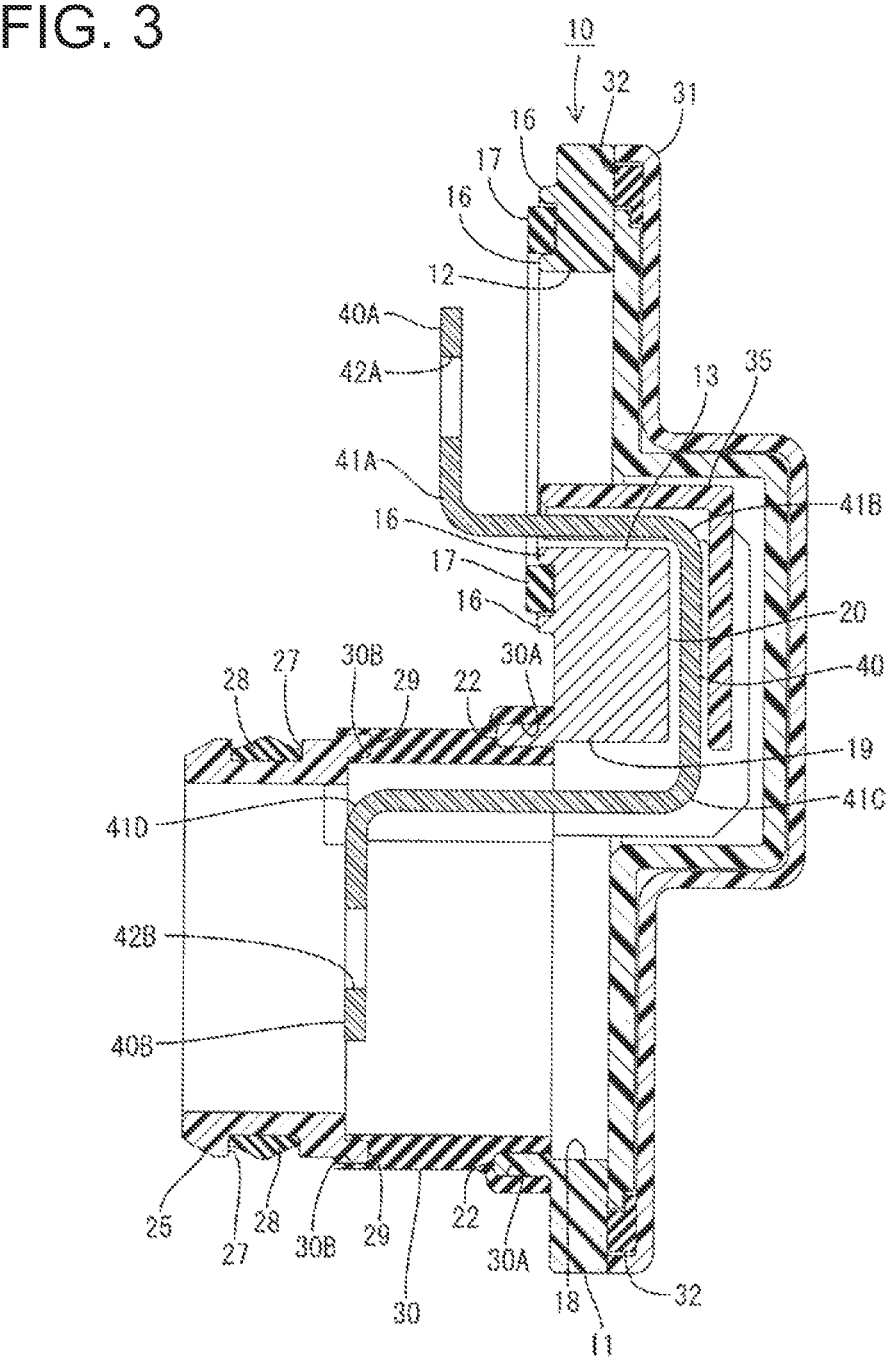
FIG. 3 is a section along A-A of FIG. 2.

As shown in FIGS. 3 and 5, a pair of ribs 16, 16 are formed along the opening edge of the first opening 12 on the outer surface of the first housing 11, and a waterproof seal member 17 for preventing water entrance into the first opening 12 is mounted between this pair of ribs 16, 16. Further, a protrusion 22 formed to project outward is provided along the opening edge of the second opening 18 on the outer surface of the first housing 11, and the coupling portion 30 is so joined as to sandwich this protrusion 22.

Figure 4:
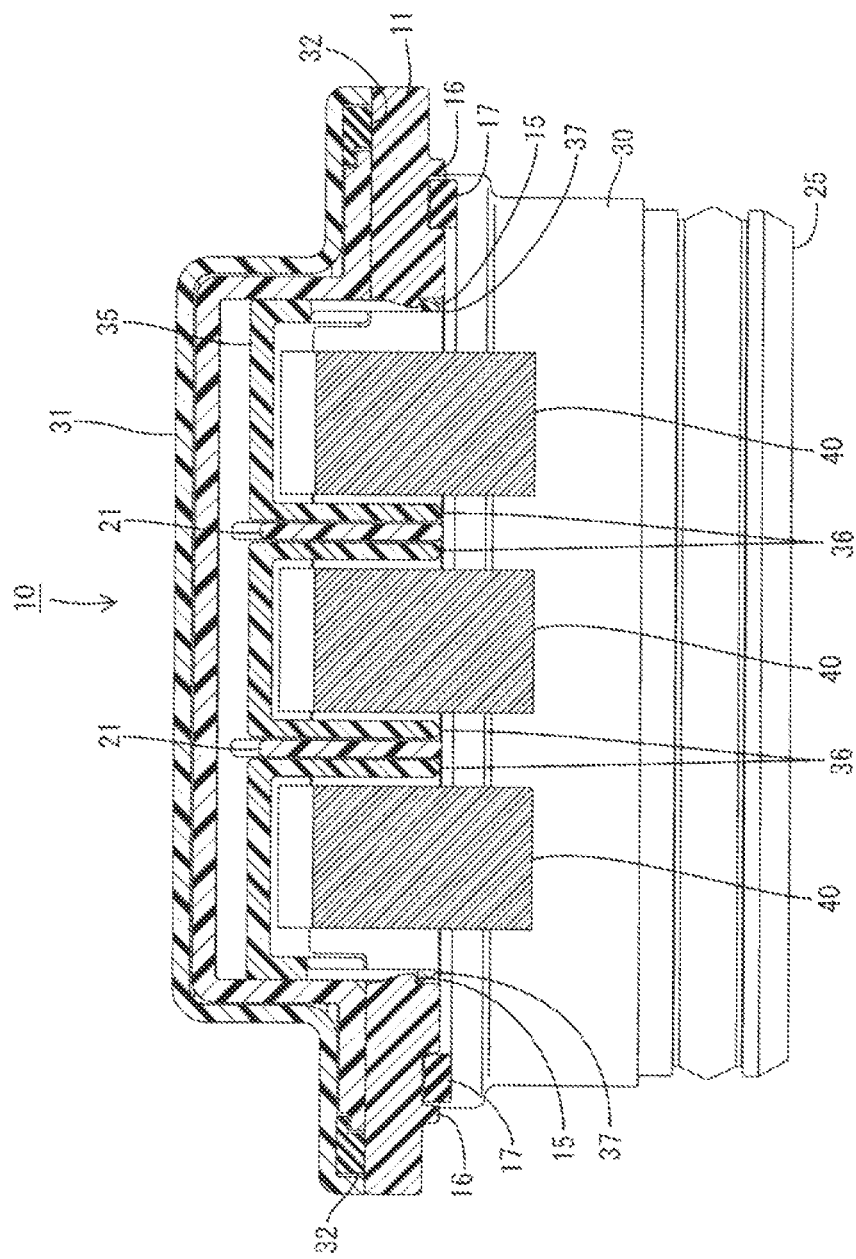
FIG. 4 is a section along B-B of FIG. 2.

A projection 20 projecting inward is formed on a part of the inner surface of the first housing 11 from the lower end surface (lower end surface 13) of the first opening 12 to the upper end surface (upper end surface 19) of the second opening 18 (see FIG. 3). As shown in FIGS. 4 and 5, partitioning protrusions 21 for partitioning the lower end surface 13 of the first opening 12 into three sections are formed to project and reach the upper end surface 19 of the second opening 18. Three busbars 40 (an example of a connecting member) are placed on the lower end surface 13 of the first opening 12 partitioned by the partitioning protrusions 21.

Further, left and right end parts of the lower end surface 13 of the first opening are stepped as shown in FIG. 5 and locking claws 15 for locking a retainer 35 (to be described later) are provided on the end surfaces of step portions 14 projecting upward from the lower end surface 13 of the first opening 12.

The second housing 25 has a tubular shape and is insertable into a receptacle of a mating connector (motor-side connector). The second housing 25 is shaped in conformity with the second opening 18 and has an elliptical opening. The interior of the second housing 25 is partitioned into three regions by partition walls 26, and other end parts 40B of the busbars 40 are arranged in the respective regions (see FIGS. 2 and 6).

A groove portion 27 is formed on the outer peripheral edge of the second housing 25, and a seal member 28 for preventing water entrance into the second housing 25 is mounted in this groove portion 27. A coupling protrusion 29 to which the coupling portion 30 is to be joined is formed to project on an end part of the second housing 25 on the side of the coupling portion 30.

The busbars 40 arranged from the first housing 11 to the second housing 25 are formed by press-working a plate material made of metal such as copper, copper alloy, stainless steel or aluminum. The outer surfaces of the busbars 40 may be plated with metal such as tin or nickel.

Figure 9:
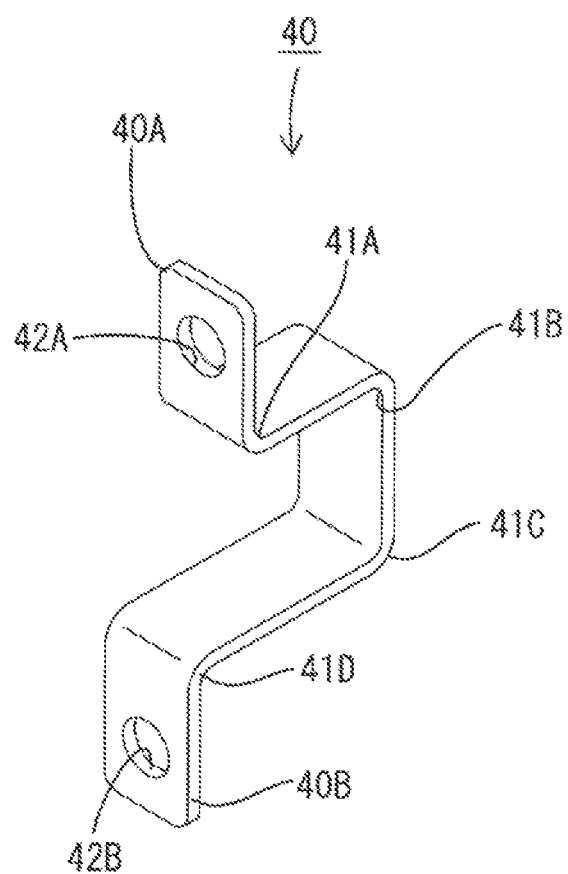
FIG. 9 is a perspective view of a connecting member.
Figure 10:
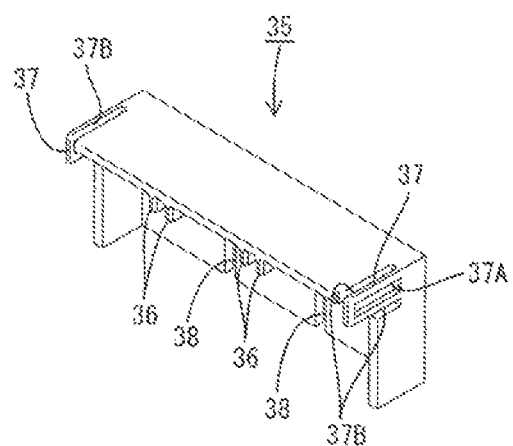
FIG. 10 is a perspective view of a retainer.

As shown in FIGS. 3 and 9, each busbar 40 is bent into a substantially U shape and resiliently deformable. Four bent portions (first bent portion 41A, second bent portion 41B, third bent portion 41C and fourth bent portion 41D in this order from top in FIG. 3) are formed between one end part 40A and the other end part 40B of the busbar 40.

As shown in FIG. 3, an area of the busbar 40 between the first and second bent portions 41A, 41B is placed on the lower end surface 13 (projection 20) of the first opening 12 and an area thereof between the second and third bent portions 41B, 41C is vertically arranged along the projection 20 in the first housing 11. Specifically, the busbar 40 is bent substantially vertically upwardly (first bent portion 41A) after being substantially perpendicularly bent in an outward lateral direction (leftward direction of FIG. 3) of the first housing 11 (second bent portion 41B) at the lower end surface 13 of the first opening 12 and projecting outward from the first opening 12. Further, the busbar 40 is substantially perpendicularly bent downwardly (fourth bent portion 41D) at a position corresponding to a joint portion 30B of the coupling portion 30 and the second housing 25 after being substantially perpendicularly bent in the outward lateral direction of the first housing 11 (third bent portion 41C) at a position slightly below the second opening 18.

Circular terminal connection holes 42A, 42B are formed on the one end part 40A (shown upper end part) and the other end part 40B (shown lower end part) of the busbar 40. The terminal connection hole 42A of the one end part 40A of the busbar 40 is a first terminal portion 42A to which a connector terminal of the inverter is to be connected. The terminal connection hole 42B of the other end part 40B of the busbar 40 is a second terminal portion 42B to which a connector terminal of the motor is to be connected.

The busbars 40 placed on the lower end surface 13 of the first opening 12 of the first housing 11 are held at a predetermined distance (about 2 mm) from the projection 20 of the first housing 11 by the retainer 35 as shown in FIG. 3.

The retainer 35 is mounted to be placed on the busbars 40 placed on the lower end surface 13 of the first opening 12. Two pairs of ribs 36, 36 are provided on the upper inner surface of the retainer 35. The partitioning protrusion 21 of the first opening 12 is fitted between each pair of ribs 36, 36.

A rectangular locking hole 37 into which the locking claw 15 provided on the step portion 14 is received to be locked is formed on each of the side surfaces facing the step portions 14 of the first opening 12 out of the side surfaces of the retainer 35. Slits 37B, 37B which make each locking portion 37 of the retainer 35 formed with the locking hole 37A resiliently deformable are formed on opposite sides of the locking portion 37.

Figure 11:
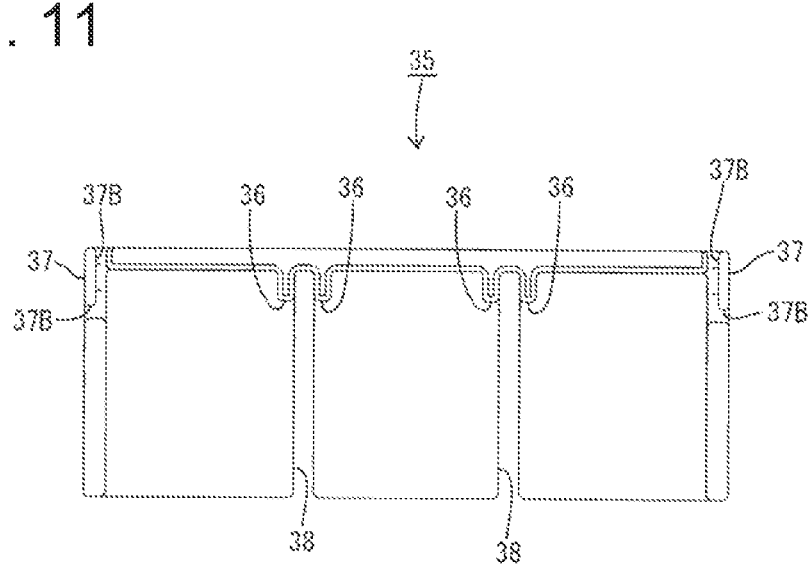
FIG. 11 is a front view of the retainer.

Grooves 38 into which the partitioning protrusions 21 are fittable are formed on the side surface of the retainer 35 to be arranged to face a lid member 31 of the connector 10 as shown in FIG. 11.

The lid member 31 of the connector 10 is shaped to project laterally outward at a position corresponding to the projection 20 of the first housing 11. A seal member 32 is fitted along the outer peripheral edge of the lid member 31 to prevent water entrance into the connector 10.

The tubular coupling portion 30 is formed between the protrusion 22 of the second opening 18 of the first housing 11 and the coupling protrusion 29 of the second housing 25. The coupling portion 30 is joined to the first housing 11 to sandwich the protrusion 22 of the second opening 18 and joined to the second housing 25 to sandwich the coupling protrusion 29.

The coupling portion 30 is made of a rubber material and formed by two-color molding or insert molding. A material known as a material for the seal members 17, 28 and 32 such as silicon-based rubber can be used as the rubber material for forming the coupling portion 30.

Next, a method for manufacturing the connector 10 of this embodiment is described.

Figure 6:
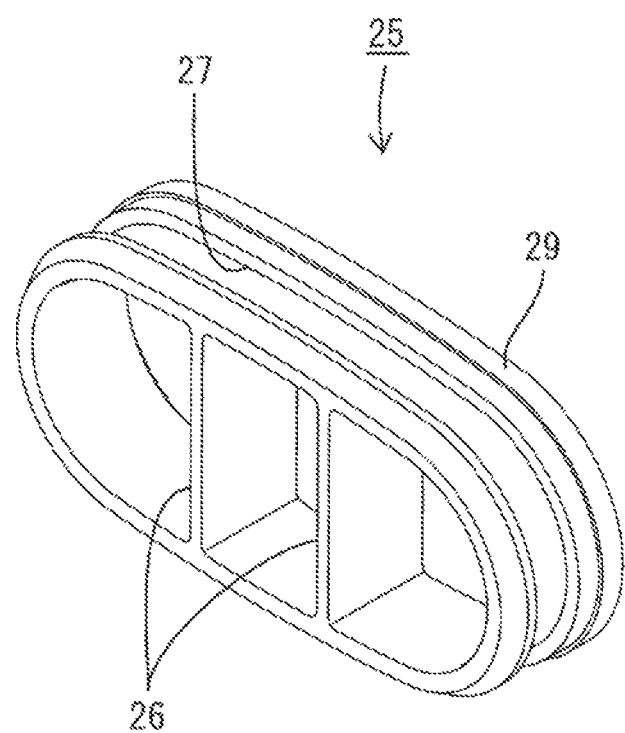
FIG. 6 is a perspective view of the second housing.
Figure 7:
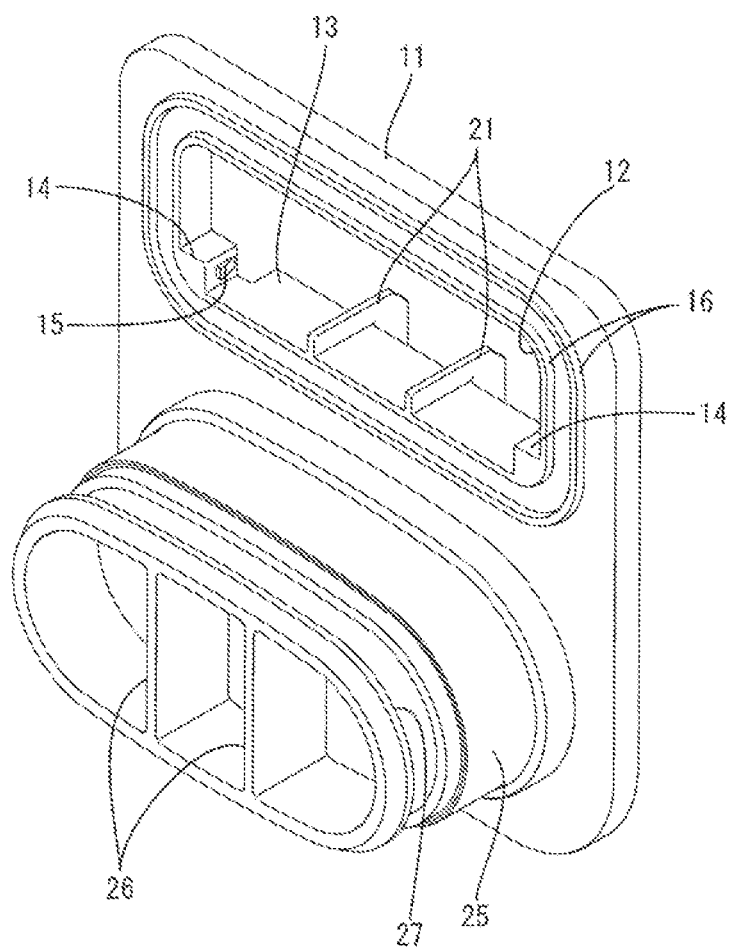
FIG. 7 is a perspective view showing a state where the first and second housings are coupled.
Figure 8:
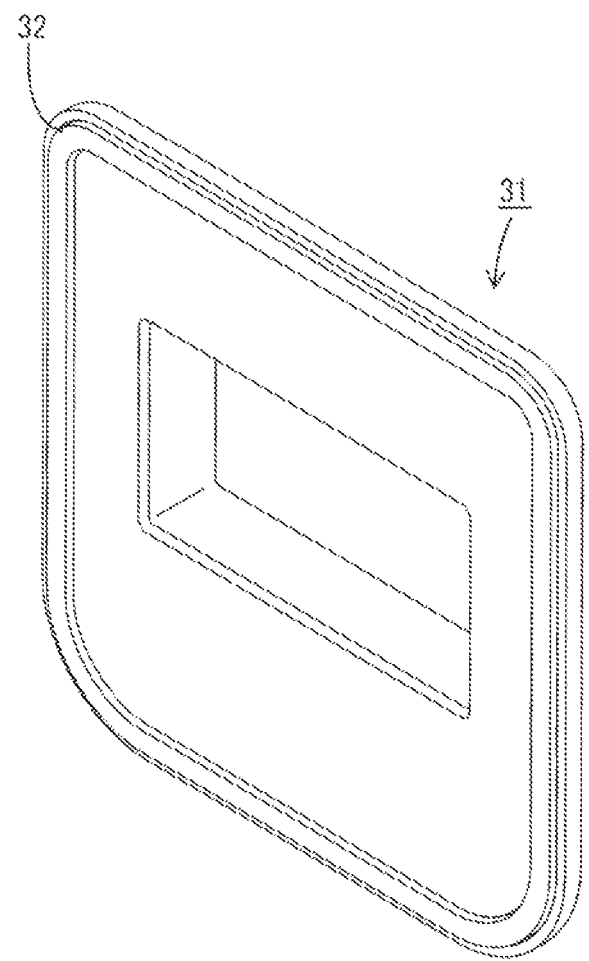
FIG. 8 is a perspective view showing a lid member to be mounted on a back side of the connector.

The first and second housings 11, 25 are respectively joined to the coupling portion 30 to be united (uniting step, see FIGS. 5 to 7). Specifically, the material of the first and second housings 11, 25 (synthetic resin material) and the material of the coupling portion 30 (silicon rubber) are poured into a predetermined mold for molding (two-color molding), and the first and second housings 11, 25 are joined to the coupling portion 30 to be united. Alternatively, either the first and second housings 11, 25 or the coupling portion 30 is fabricated in advance, and the first and second housings 11, 25 are joined and united by the coupling portion 30 by insert molding.

Simultaneously with or before or after the above uniting step, the respective components (busbars 40, lid member 30, retainer 35) are fabricated. In the process of fabricating the busbars 40, three busbars shaped as shown in FIG. 9 are fabricated by applying a bending process after the metal plate material is press-worked.

The seal members 17, 28 and 32 are respectively mounted between the ribs 16, 16 at the opening edge of the first opening 12 of the first housing 11, in the groove portion 27 of the second housing 25 and on the lid member 31.

Subsequently, the three busbars 40 are mounted from the right side of FIG. 3 and the areas between the first bent portions 41A and the second bent portions 41B are placed on the lower end surface 13 of the first opening 12 of the first housing 11.

Subsequently, when the retainer 35 is mounted on the busbars 40 placed on the lower end surface 13 of the first opening 12, the partitioning protrusions 21 are fitted into between the ribs 36, 36 on the upper surface of the retainer 35 and then fitted into the grooves 38 on the side surface of the retainer 35. The locking portions 37 of the retainer 35 are deflected inwardly when coming into contact with the locking claws 15 of the first opening 12, but the locking portions 37 resiliently return to lock the retainer 35 when the locking claws 15 of the first opening 12 are arranged into the locking holes 37A of the retainer 35. The busbars 40 are held at the predetermined distance from the projection 20 of the first housing 11 by the retainer 35. When the lid member 31 is subsequently mounted on the back side of the connector 10, the connector 10 of this embodiment is completed.

Next, functions and effects of this embodiment are described.

In this embodiment, the rubber-made coupling portion 30 coupling the first and second housings 11, 25 absorbs manufacturing tolerances and mounting tolerances of the first device connected to the first terminal portions and the second device connected to the second terminal portions and also vibration of the devices. As a result, according to this embodiment, it is possible to provide the connector 10 capable of absorbing tolerances and vibration of the devices.

Further, since the coupling portion 30 is united with the first and second housings 11, 25 by two-color molding or insert molding according to this embodiment, the coupling portion 30, the first and second housings 11, 25 are firmly joined and joint portions 30A, 30B have excellent strength and waterproof sealability as compared with the case where they are joined by an adhesive.

Further, since the busbar 40 including the first terminal portion on the one end part 40A and the second terminal portion on the other end part 40B is provided according to this embodiment, two devices can be connected by one busbar 40. Thus, a simple configuration can be adopted and manufacturing cost can be reduced.

Further, since the resiliently deformable bent portions are provided between the one end part 40A and the other end part 40B of the busbar 40 according to this embodiment, tolerances of the devices can be absorbed by resilient deformation of the bent portions of the busbar 40 between the two housings 11 and 25.

The present invention is not limited to the above described and illustrated embodiment. For example, the following embodiments are also included in the technical scope of the present invention.

Although the busbar including the first terminal portion on the one end part and the second terminal portion on the other end part is provided in the above embodiment, a busbar including only a first terminal portion, a busbar including only a second terminal portion and a connecting member for connecting these two busbars may be provided.

Although the busbar including the resiliently deformable bent portions between the one and other end parts is provided in the above embodiment, the busbar may not include any resiliently deformable bent portion.

Although the retainer is provided in the above embodiment, it may not be provided.

The invention claimed is:

1. A connector, comprising:
a first housing made of resin and including a first terminal portion connected to a first device;
a second housing made of resin and including a second terminal portion connected to a second device; and
a coupling portion made of rubber and formed by insert molding or two-color molding, the coupling portion coupling and uniting the first and second housings so that the coupling provides the only coupling between the first and second housings and absorbs manufacturing tolerances of the first device connected to the first terminal portion and the second device connected to the second terminal portion.

2. A connector comprising: a first housing made of resin and including a first terminal portion connected to a first device and a second housing made of resin and including a second terminal portion connected to a second device, and a connecting member including the first terminal portion on one end part and the second terminal portion on another end part, wherein
the first and second housings are coupled and united by a coupling portion made of rubber and formed by insert molding or two-color molding.

3. A connector according to claim 2, wherein a resiliently deformable bent portion is provided between the one and other end parts of the connecting member.

4. A method for manufacturing a connector with a first housing made of resin and including a first terminal portion connected to a first device, a second housing made of resin and including a second terminal portion connected to a second device, and a connecting member including the first terminal portion on one end part and the second terminal portion on another end part, comprising:
a uniting step of coupling and uniting the first and second housings by a coupling portion made of rubber by insert molding or two-color molding.

5. A method according to claim 4, wherein a resiliently deformable bent portion is provided between the one and other end parts of the connecting member.

* * * * *